United States Patent
Zambetti et al.

(10) Patent No.: US 9,537,409 B2
(45) Date of Patent: *Jan. 3, 2017

(54) METHOD OF FEEDBACK COMMANDING A MONOPHASE RESONANT CONVERTER, A RELATED MONOPHASE RESONANT CONVERTER AND A POLYPHASE RESONANT CONVERTER

(71) Applicant: STMICROELECTRONICS S.R.L., Agrate Brianza (IT)

(72) Inventors: Osvaldo Enrico Zambetti, Milan (IT); Stefano Saggini, Udine (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/167,647

(22) Filed: May 27, 2016

(65) Prior Publication Data

US 2016/0276942 A1    Sep. 22, 2016

Related U.S. Application Data

(63) Continuation of application No. 14/612,124, filed on Feb. 2, 2015, now Pat. No. 9,379,628.

(30) Foreign Application Priority Data

Feb. 3, 2014  (IT) .............................. MI2014A0150

(51) Int. Cl.
*H02M 3/335* (2006.01)
*H02M 1/08* (2006.01)
*H02M 1/00* (2006.01)

(52) U.S. Cl.
CPC ........... *H02M 3/33546* (2013.01); *H02M 1/08* (2013.01); *H02M 2001/0009* (2013.01)

(58) Field of Classification Search
CPC ........... H02M 2001/0048; H02M 2001/00058; H02M 2003/1586
See application file for complete search history.

(56) References Cited

U.S. PATENT DOCUMENTS 4,860,184 A     8/1989  Tabisz et al.
2004/0136209 A1  7/2004  Hosokawa et al.
(Continued)

FOREIGN PATENT DOCUMENTS

EP        1 646 133 A2    4/2006
KR     1020090072561 A    7/2009

OTHER PUBLICATIONS

Huber et al., "1.8-MHz, 48-V Resonant VRM," Twentieth Annual IEEE Applied Power Electronics Conference and Exposition (APEC 2005), Austin, TX, Mar. 6-10, 2005, pp. 294-300.
(Continued)

*Primary Examiner* — Timothy J Dole
*Assistant Examiner* — Yusef Ahmed
(74) *Attorney, Agent, or Firm* — Seep IP Law Group LLP

(57) ABSTRACT

A resonant converter includes a primary switching circuit having a primary winding and a primary switching stage configured to drive the primary winding; a secondary resonant circuit having a secondary winding magnetically coupled to the primary winding, a resonance capacitor connected in parallel to the secondary winding, and first and second secondary inductors respectively coupled between an output terminal of the converter and respective terminals of the resonance capacitor; a rectification stage connected in parallel with the resonance capacitor, and having first and second switches coupled to form a half-bridge; and a feedback command circuit. The command circuit is configured to receive feedback signals representing an output voltage and an output current at the output terminal of the resonant converter, receive voltages at the terminals of the resonance capacitor, and turn on/off, independently with respect to each other, the switches of the rectification stage and the primary switching stage.

19 Claims, 16 Drawing Sheets

(56) References Cited

U.S. PATENT DOCUMENTS

| | | | |
|---|---|---|---|
| 2006/0220591 A1* | 10/2006 | Marchand | H02M 3/33561 315/209 R |
| 2009/0097280 A1 | 4/2009 | Wu et al. | |
| 2010/0232180 A1 | 9/2010 | Sase et al. | |
| 2010/0302817 A1 | 12/2010 | Usui | |
| 2011/0194206 A1 | 8/2011 | Sase et al. | |
| 2011/0273909 A1* | 11/2011 | Christopher | H02M 3/3376 363/17 |
| 2011/0299301 A1 | 12/2011 | Huang | |
| 2013/0265804 A1 | 10/2013 | Fu et al. | |
| 2014/0111016 A1 | 4/2014 | He et al. | |
| 2014/0153289 A1 | 6/2014 | Kao et al. | |
| 2014/0198538 A1* | 7/2014 | Kimura | H02M 3/3376 363/21.09 |
| 2014/0204617 A1* | 7/2014 | Itou | H02M 3/33507 363/17 |
| 2014/0226369 A1* | 8/2014 | Kimura | H02M 3/3376 363/21.09 |
| 2014/0265641 A1* | 9/2014 | Inoue | H02M 7/48 307/151 |
| 2014/0347767 A1* | 11/2014 | Nakamura | H02M 1/32 361/18 |
| 2015/0023062 A1* | 1/2015 | Hyugaji | H02M 3/33592 363/16 |

OTHER PUBLICATIONS

Huber et al., "1.8-MHz, 48-V Resonant VRM: Analysis, Design, and Performance Evaluation," *IEEE Transactions on Power Electronics* 21(1):79-88, Jan. 2006.

Jovanovic et al., "Mode Analysis of Half-Bridge Zero-Voltage-Switched Multi-Resonant Converter," 20$^{th}$ Annual IEEE Power Electronics Specialists Conference (PESC '89 Record), Milwaukee, WI, Jun. 26-29, 1989, pp. 252-261.

Lee et al., "Phase Management Control Applied to Two-Phase Interleaved Half-Bridge LLC Resonant Converter with Phase-Shift Power Factor Correction," IEEE International Symposium on Industrial Electronics (ISIE), pp. 1-6, May 28-31, 2013.

* cited by examiner

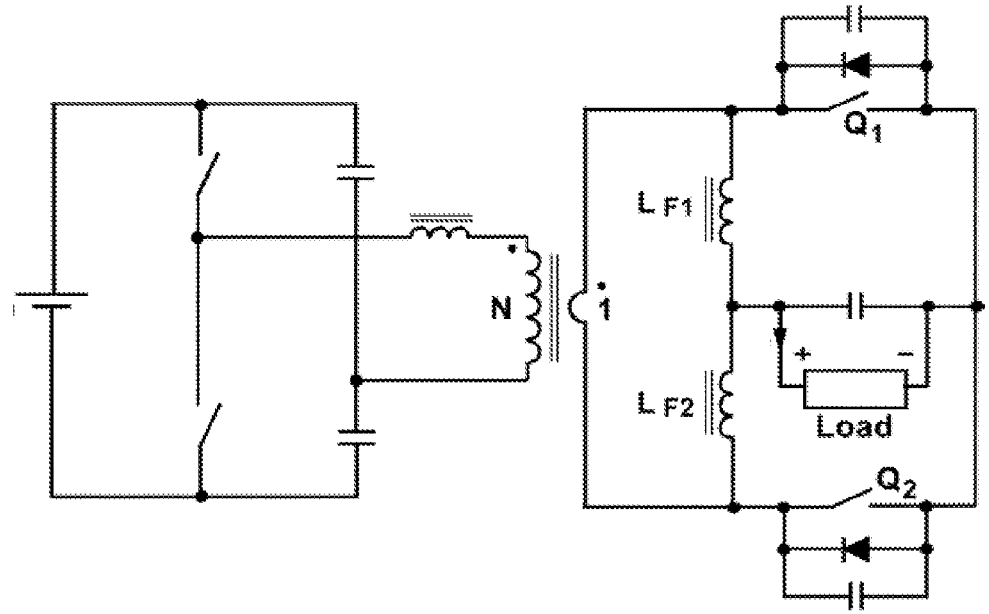
FIG. 1 *(Prior Art)*
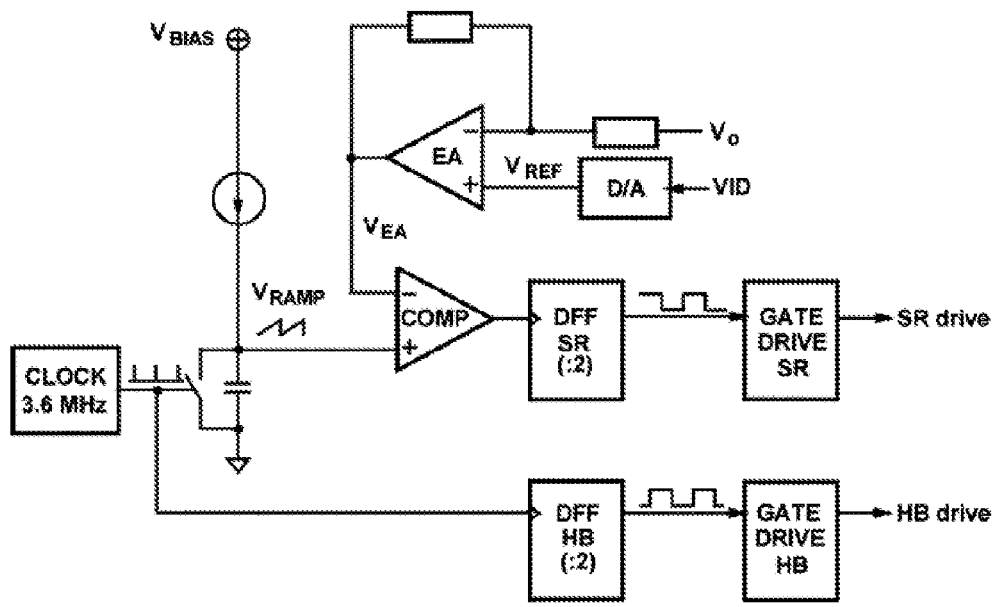
FIG. 2 *(Prior Art)*

METHOD OF FEEDBACK COMMANDING A MONOPHASE RESONANT CONVERTER, A RELATED MONOPHASE RESONANT CONVERTER AND A POLYPHASE RESONANT CONVERTER

BACKGROUND

Technical Field

This disclosure relates to resonant converters and more particularly to a method of feedback commanding a monophase resonant converter, to a related monophase resonant converter and to a polyphase resonant converter.

Description of the Related Art

Power distribution in server and data-center fields is continuously expanding. For continuous improvement of these electronic devices it is desirable to maximize the efficiency of voltage converters that supply them in order to minimize the supplied power for providing the same used power, in order to limit thermal dissipation in environments in which they are installed and thus the power absorbed by the relative cooling appliances.

There are various voltage distribution systems, powered by the mains voltage, to generate the $V_{CPU}$ supply voltage for processors. Presently, the mains voltage is converted into a first voltage distributed through a main supply bus, then converted into a second lower voltage (typically 12V) distributed on an intermediate bus and finally converted into the supply voltage $V_{CPU}$ of processors. In order to optimize the efficiency of systems upstream the processor, the main supply bus is at a voltage of 48V.

It is thus to be chosen to regulate the voltage of the processor either using the main supply bus at 48V throughout the intermediate bus at 12V, in order to shorten transient response, or directly from the bus at 48V, in order to enhance conversion efficiency.

A solution for carrying out the second conversion in a two-stage system ($48V$–$12V$–$V_{CPU}$) is to use polyphase switching regulators, that allow to have an optimal response to load transients, the possibility of sinking current from the load (sink mode) and to keep good efficiency of the stage itself. In polyphase buck converters, thanks to different control techniques, it is possible to meet response specifications to load transients and to changes of reference voltage. Nevertheless, these converters work at low duty-cycles and provide a double voltage conversion from 48V, the voltage of the supply bus, down to the final voltage $V_{CPU}$, generating an intermediate voltage at 12V.

It is known to use voltage resonant converters for generating regulated voltages of a level adapted to power processors. The article by L. Huber et al. "1.8 MHz 48V Resonant VRM: Analysis, Design and Performance Evaluation", IEEE Trans. on Power Electronics, Vol. 21, No. 1, January 2006, discloses a voltage resonant converter of the type shown in FIG. 1. It has a primary half-bridge switching stage for forcing an AC current through a primary winding, composed of N loops magnetically coupled with a secondary winding electrically connected in parallel with a capacitance for forming a resonant circuit. The first and second secondary inductors $L_{F1}$, $L_{F2}$ cooperate in order to provide the load LOAD with the requested current IO. The voltages on the secondary inductors $L_{F1}$ and $L_{F2}$ are outphased between them and their mutual outphasing is regulated through the switches $Q_1$ and $Q_2$, commanded by the command circuit of FIG. 2, such to regulate the voltage $V_O$ at the load. The command circuit implements a fixed frequency control technique in which the desired outphasing between the secondary inductors $L_{F1}$ and $L_{F2}$ is attained by outphasing the on/off signals SR of the switches at the secondary side in respect to the on/off signals of the switches of the half-bridge at the primary side. This outphasing is determined by the voltage of the error amplifier EA and thus by the difference between the output voltage $V_O$ and a reference voltage.

An advantage of this solution is the possibility of connecting modules in parallel because it works at a fixed frequency and thus the modules may be easily operated to be interleaved among them.

Nevertheless, it presents numerous drawbacks, among which:

1) Latency of the response to load variations due to the fixed working frequency;

2) Voltage dynamics at the secondary inductors that depend upon the compensation operated by the error amplifier EA;

3) Optimization of the system efficiency only at a certain duty cycle;

4) Difficulty of compensation because of the complex control law;

5) It does not allow to work in sink mode.

The first drawback is minimized thanks to the use of a high switching frequency (typically 1.8 MHz equivalent) but this choice implies an increment of switching losses (typically, of MOSFETs) at the primary side (HB) and at the secondary side (SR).

The second drawback is very dangerous because it may compromise reliability of the converter. Indeed, the duration of the charge phase of the secondary inductors is determined by the error amplifier EA thus, with a too aggressive compensation or even an instable compensation, the leakage inductance at the primary side may be excessive and may raise voltages at the secondary inductors to values that may make the secondary switches (typically, MOSFETs) work outside the respective safe operating area.

Also the third drawback is due to the fixed working frequency. The duration of each half-wave at the secondary side at the secondary inductors is essentially determined by the resonance frequency of the converter, that is a fixed amount, and in the hypothesis that this half-wave is rectangular for sake of ease. Therefore the converter, in order to regulate the voltage with a certain duty-cycle, must necessarily increase the peak of the half-wave at the secondary side by pre-charging the leakage inductance. This behavior, imposed by the command loop, makes the rms value of the current flowing throughout the MOSFETs greater than the minimum value requested for delivering the output current at any duty cycle. An optimization will occur only at the output voltage such that the peak of half-waves at the secondary side is comparable with the input voltage scaled by a factor N of the transformer (plus an eventual difference due to resonance).

This output voltage is about VOUT=Tres/Tsw*VIN wherein VIN is the input voltage, Tres is the duration of each half-wave at the secondary side, equal to the resonance period, and Tsw the reciprocal of the switching frequency of each switch at the secondary side.

BRIEF SUMMARY

It would be desirable to carry out a voltage conversion directly from the bus at 48V down to the supply voltage of microprocessors (or of a generic low voltage load) ensuring the stability of the feedback loop in all functioning conditions and keeping constant the modulation gain when the reference voltage and the input voltage vary. With this technique, a high efficiency conversion would be obtained and at the same time short responses to load transients or to reference variations comparable to those of a buck converter, eventually also a polyphase buck converter, would be obtained.

One embodiment of the present disclosure is a resonant converter comprising:

a primary switching circuit having at least a primary winding and a primary full bridge switching stage configured to drive said primary winding, a secondary resonant circuit having a secondary winding magnetically coupled with the primary winding, a resonance capacitor ($C_R$) electrically connected in parallel with the secondary winding, a first secondary inductor ($L_1$) and a second secondary inductor ($L_2$) respectively connected between an output terminal of the converter and respective terminals of the resonance capacitor ($C_R$), a secondary rectification stage electrically connected in parallel with the resonance capacitor ($C_R$), having two switches first and second connected to form a half-bridge with an intermediate tap connected to ground, and a feedback command circuit configured to:

receive in input feedback signals (VOUT, KIOUT) representing an output voltage (VOUT) available at the output terminal of the resonant converter and an output current (KIOUT) delivered throughout said output terminal, receive in input the voltages referred to ground (PH1, PH2) available at the terminals of said resonance capacitor ($C_R$), turn on/off switches of said primary switching stage and of the secondary rectification stage, receive in input the voltages, referred to ground, available at the terminals of the resonance capacitor ($C_R$).

This resonant capacitor presents a high conversion efficiency and response times to load transients comparable with those of buck converters, when it is commanded so as to execute cyclically the following sequence of operations:

1)—STOP1—turning on low-side switches of said primary switching stage and both switches of said secondary rectification stage and turning off high-side switches of the primary switching stage;

2)—ENERGY1+START1—switching the switches of the primary switching stage so as to energize the primary circuit with a positive half-wave, while keeping on the switches of the secondary rectification stage and monitoring the current flowing throughout said first switches of the secondary rectification stage;

3)—RELEASE1—turning off the first switch of the secondary rectification stage and monitoring the voltage at the first switch, when a zero cross condition of the current flowing throughout said first switch is detected;

carrying out one of the two following operations:

4a)—DISCHARGE1—before the voltage at the first switch of the secondary rectification stage nullifies, turning off the low-side switches and turning on the high-side switches of said primary switching stage, or 4b)—RECTIFICATION1—after the voltage at the first switch of the secondary rectification stage has nullified, switching the switches of the primary switching stage such to energize the primary circuit with a positive half-wave, keeping on the switches of the secondary rectification stage;

carrying out the steps from 1 to 4a or 4b exchanging between them the roles of the high-side and low-side switches of the primary switching stage and exchanging between them the roles of the first switch and of the second switch of the secondary rectification stage so as to energize the primary circuit with a positive half-wave.

It is further possible to realize a polyphase resonant converter by connecting in parallel among them a plurality of monophase resonant converters of this disclosure.

The claims as filed are integral part of this specification and are herein incorporated by reference.

BRIEF DESCRIPTION OF THE SEVERAL VIEWS OF THE DRAWINGS

FIG. 1 shows a known resonant converter.

FIG. 2 depicts a command circuit of the known converter of FIG. 1.

Figures from 3 to 5 show different embodiments of a resonant converter according to this disclosure.

Figures from 6 to 11 show different functioning conditions of a converter according to this disclosure for implementing a related method of commanding.

Figure 3:
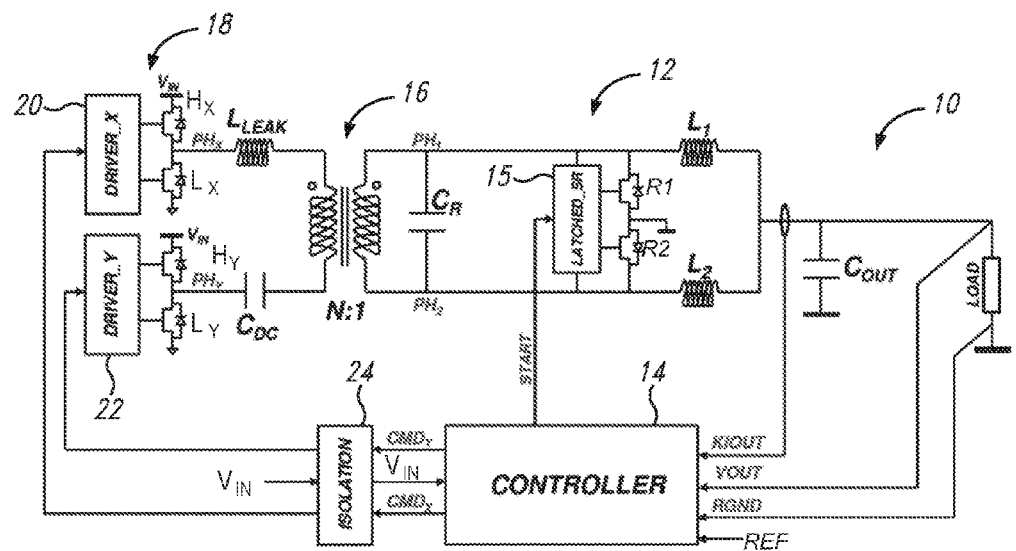
Figure 5:
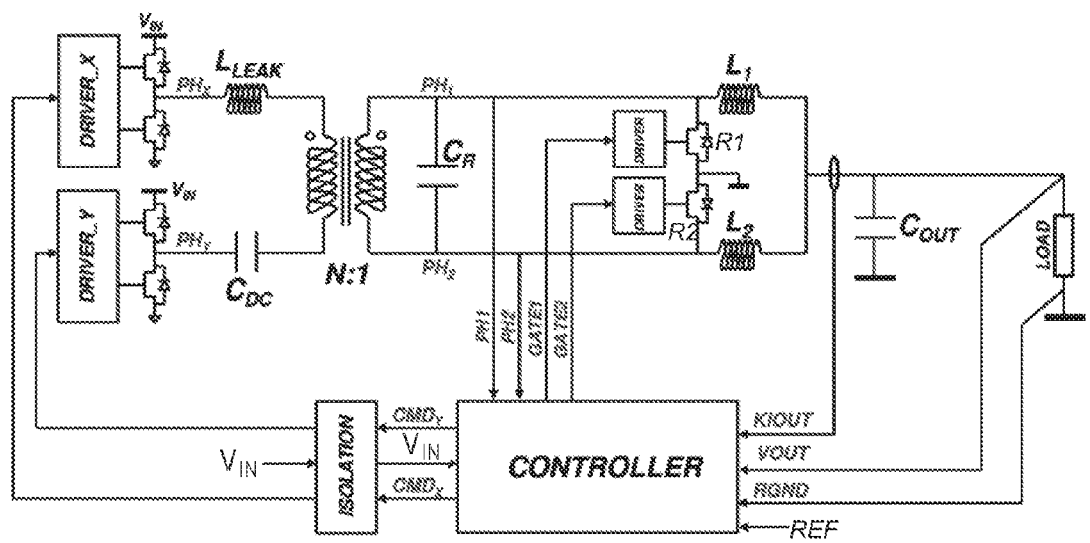
Figure 6:
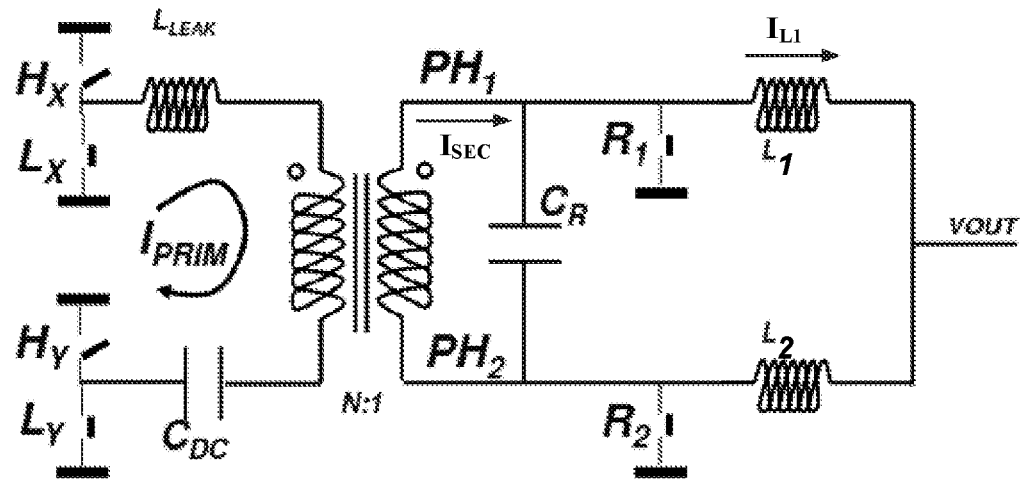
Figure 12:
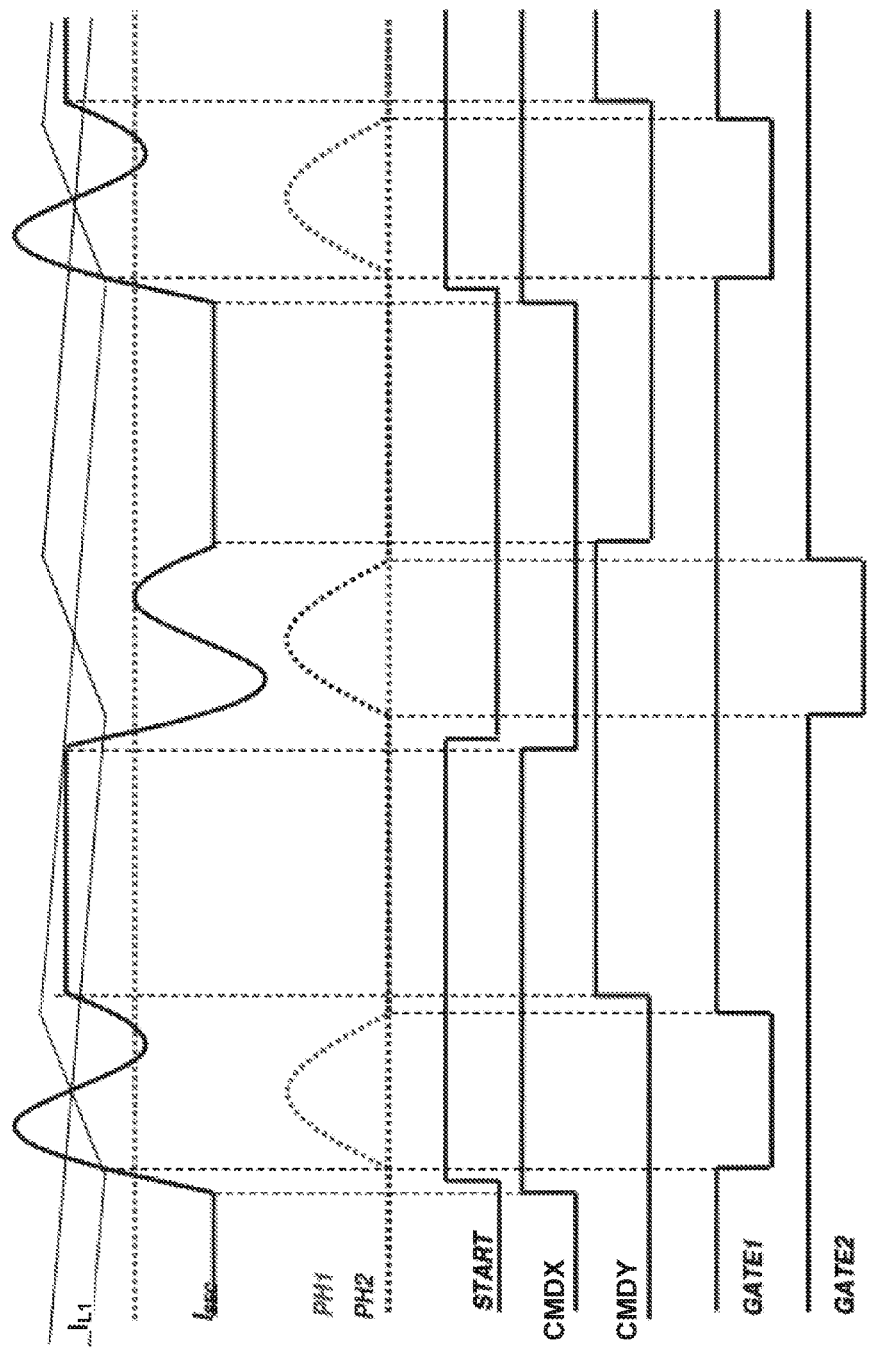

FIG. 12 is a time graph of the main signals of the converters of FIG. 3 and of FIG. 5 when commanded according to the method of this disclosure.

Figure 4:
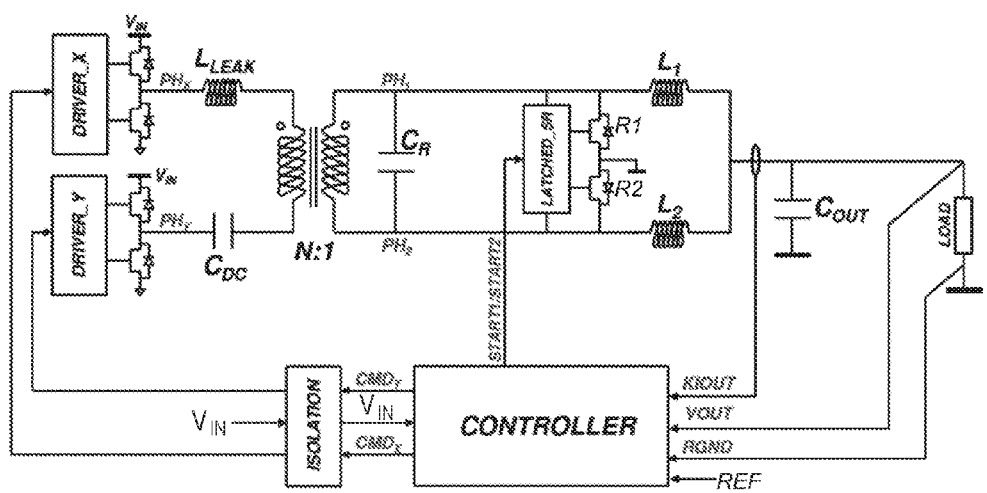
Figure 13:
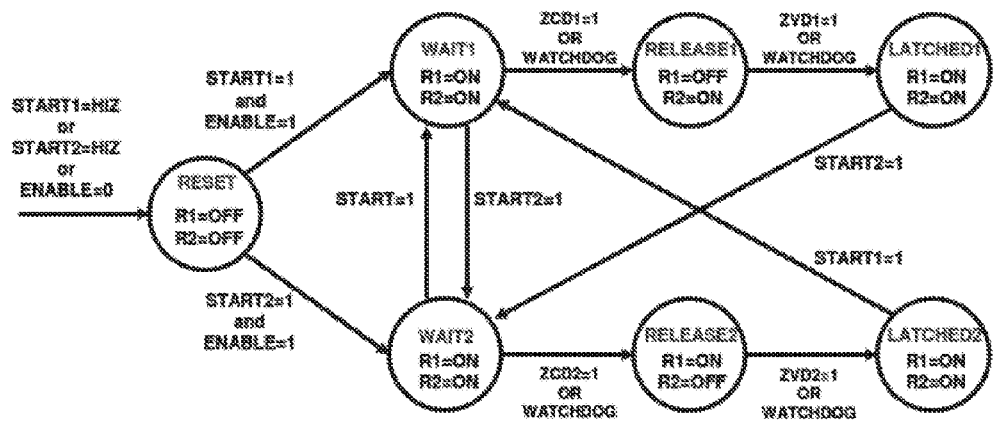

FIG. 13 is a state diagram illustrating the method of commanding according to this disclosure in the converter of FIG. 4.

Figure 14:
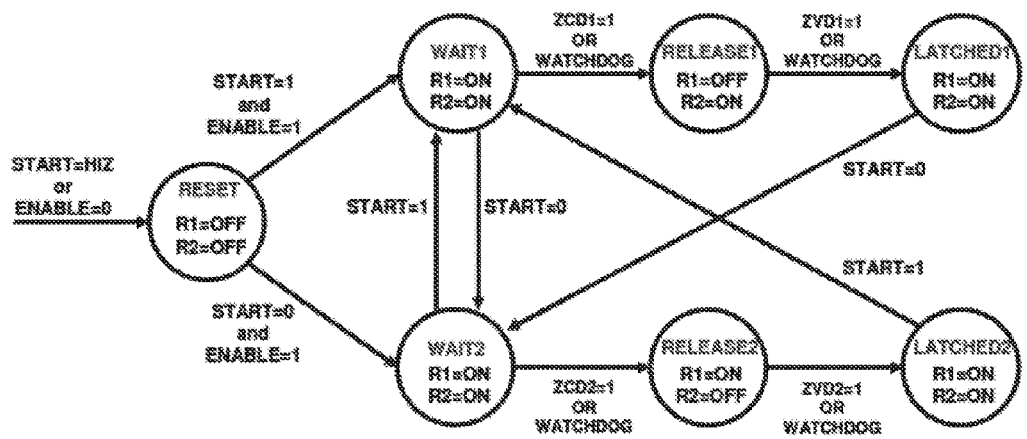

FIG. 14 is a finite state diagram illustrating the method of commanding according to this disclosure in the converter of FIG. 3.

Figure 15:
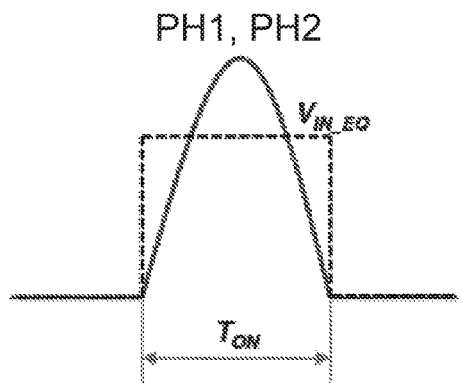

FIG. 15 is a time graph illustrating how to determine the value of the equivalent voltage $V_{IN\_EQ}$ of a voltage towards ground PH1 or PH2.

Figure 16:
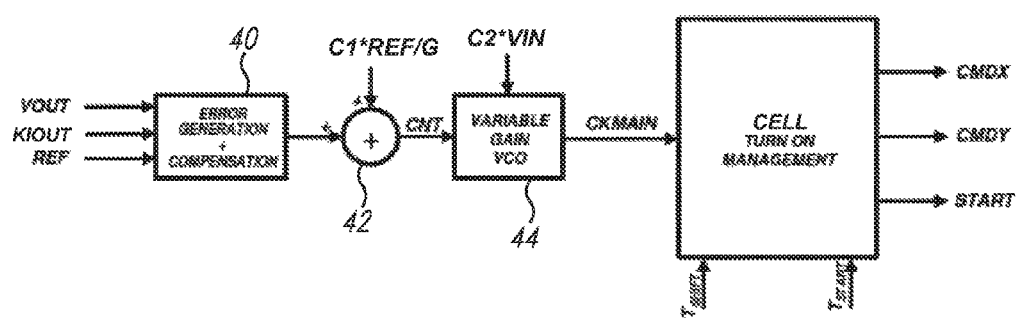

FIG. 16 shows an analog control circuit for a monophase resonant converter according to this disclosure.

Figure 17:
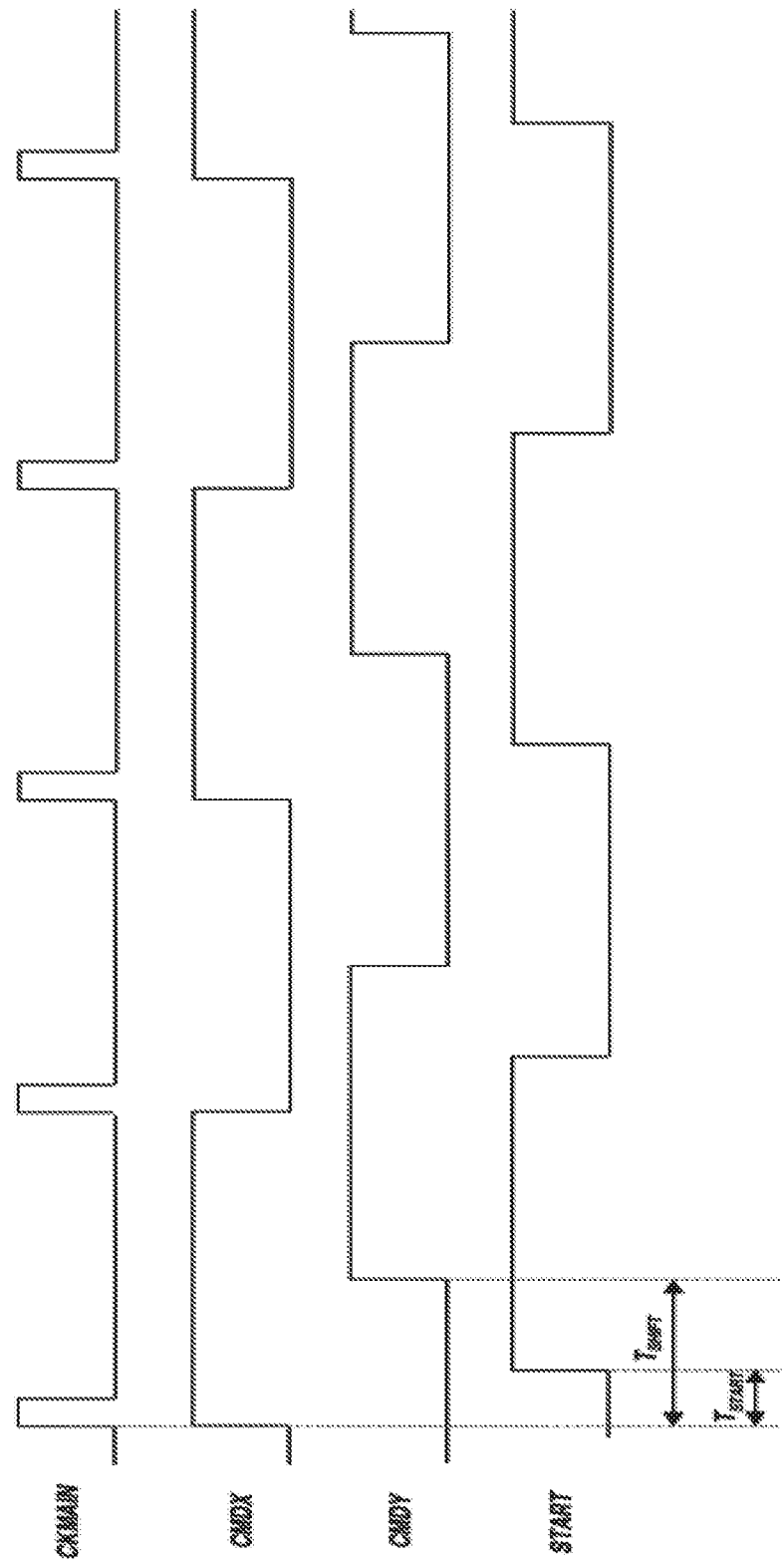

FIG. 17 is a time graph of the main signals of the control circuit of FIG. 16.

Figure 18:
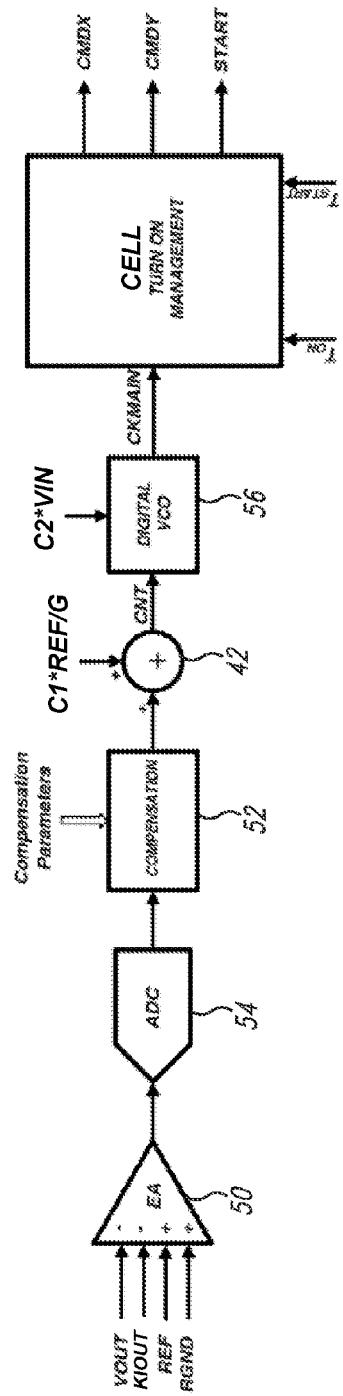

FIG. 18 shows another analog control circuit for a monophase resonant converter according to this disclosure.

Figure 19:
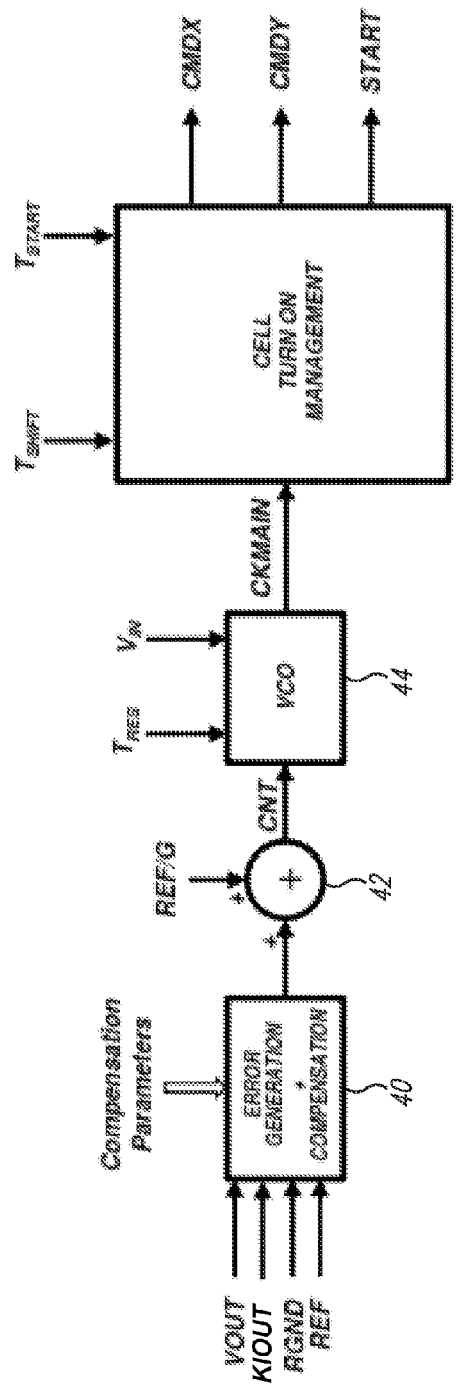

FIG. 19 shows another digital control circuit for a monophase resonant converter according to this disclosure.

Figure 20:
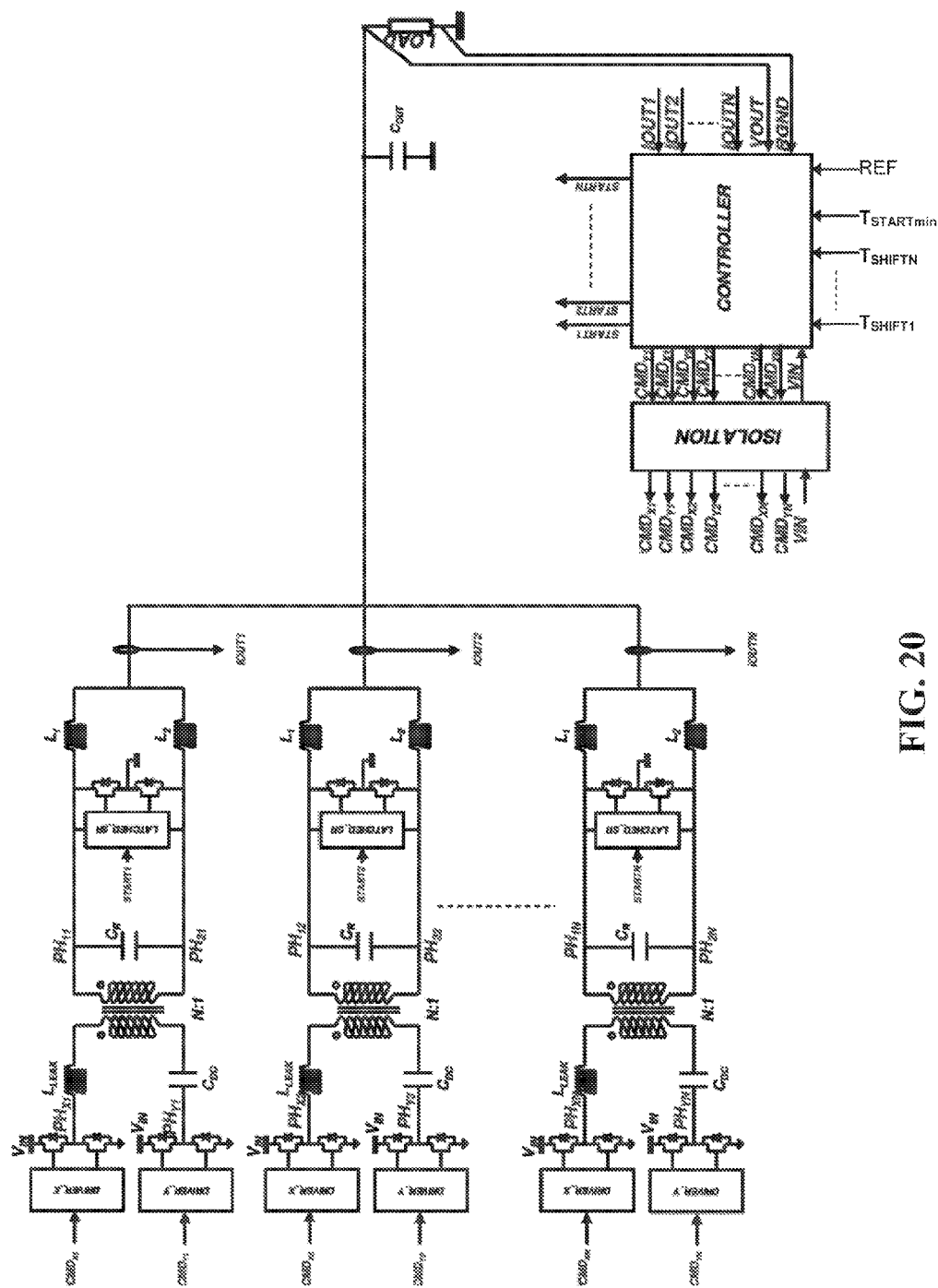

FIG. 20 illustrates a polyphase resonant converter comprising a plurality of resonant converters of this disclosure connected in parallel.

Figure 21:
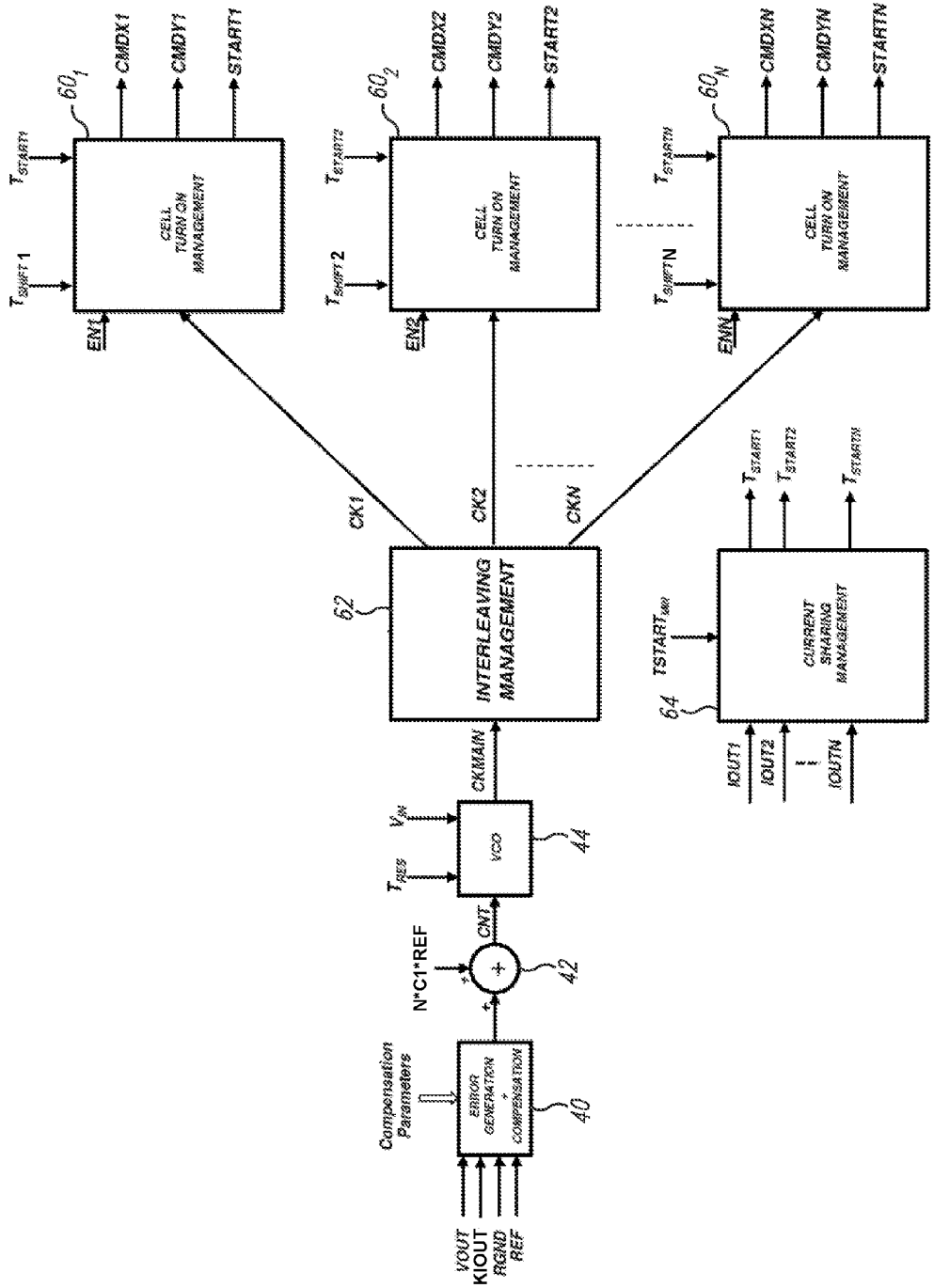

FIG. 21 shows a control circuit for the polyphase resonant converter of FIG. 20.

Figure 22:
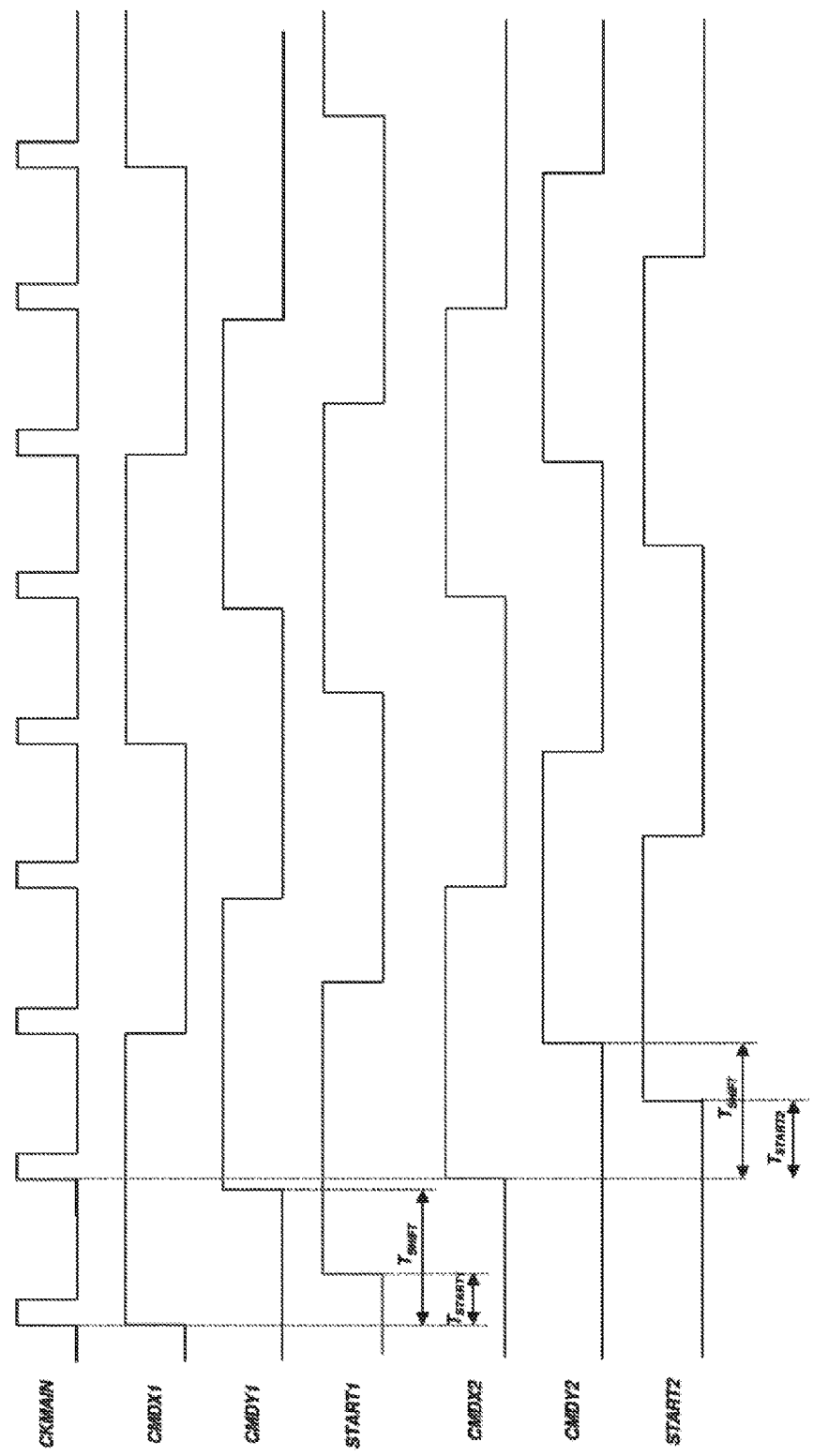

FIG. 22 is a time graph of the main signals of the polyphase resonant converter of FIG. 21.

Figure 23A:
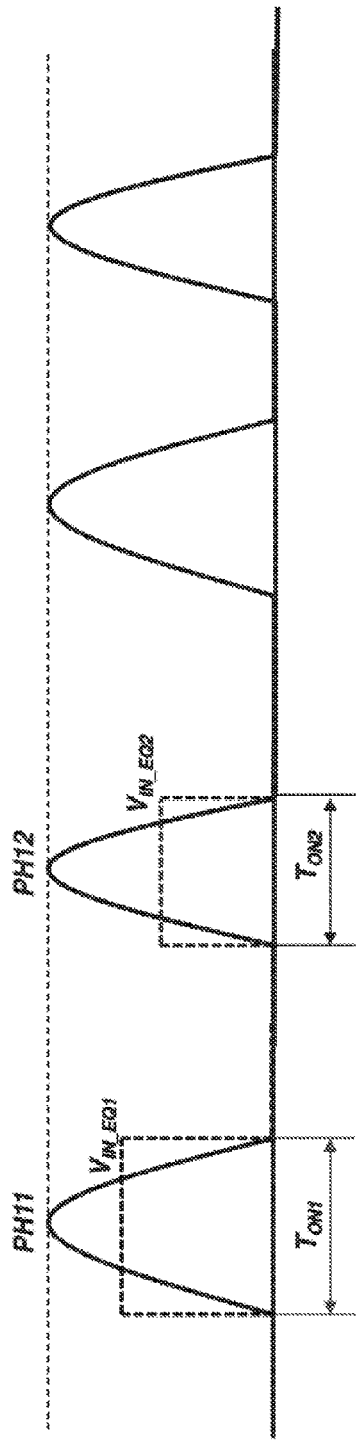
Figure 23B:
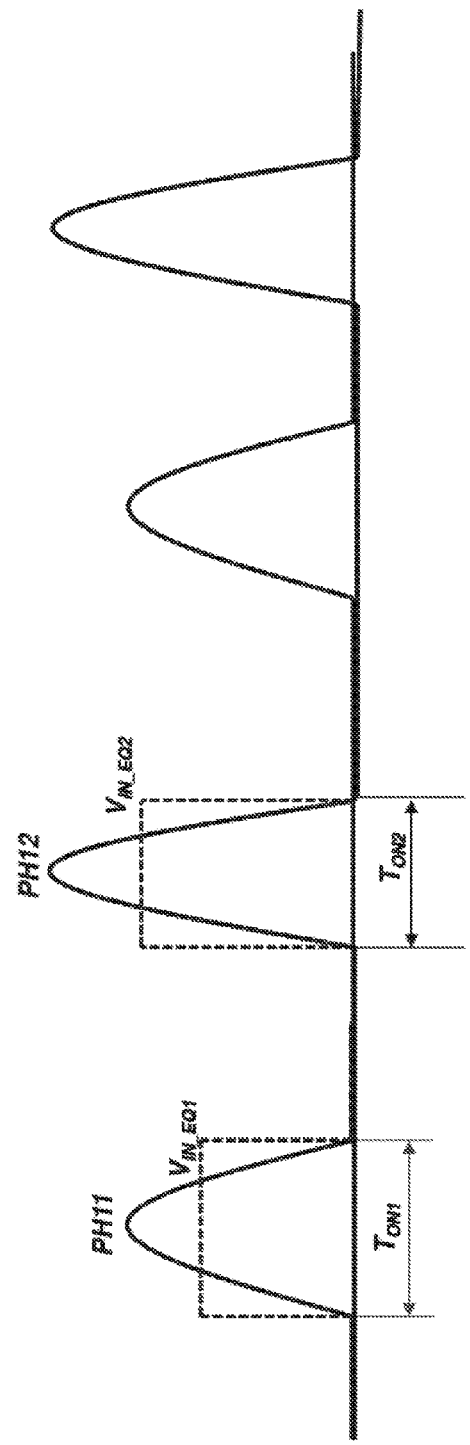

FIGS. 23a and 23b are time graphs that illustrate how the control circuit of FIG. 21 acts for equalizing the currents delivered by the various phases of the polyphase resonant converter of FIG. 20.

Figure 24:
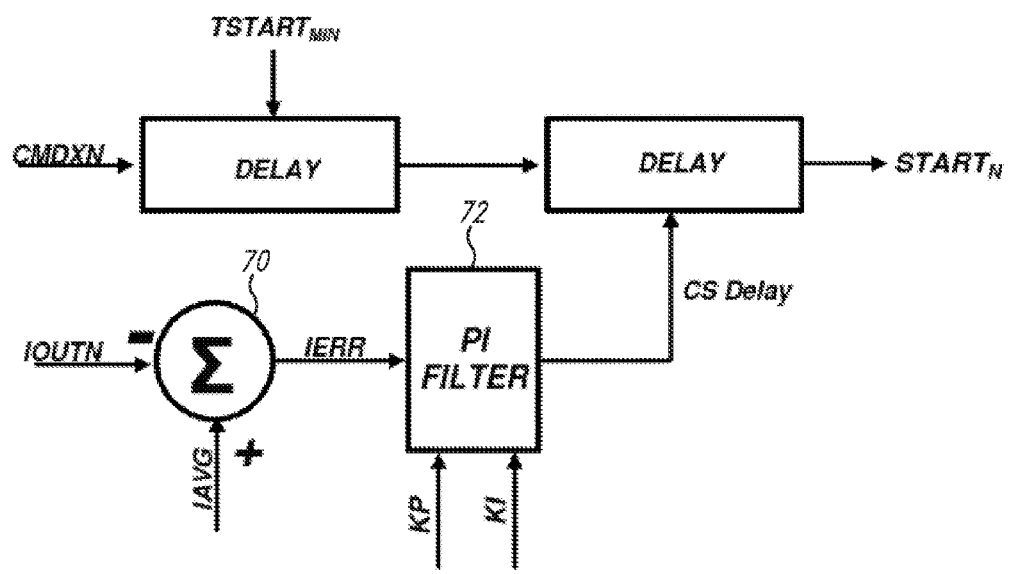

FIG. 24 shows a control circuit for the polyphase resonant converter of FIG. 20.

DETAILED DESCRIPTION

Alternative embodiments of resonant converters according to this disclosure are shown in FIGS. 3 to 5. It has a full-bridge topology with resonance capacitor at the secondary (CR).

The blocking capacitor CDC is optional; its function is to block the DC component at the primary side in order to allow to circulate only AC current.

The herein proposed converter 10 has a rectification stage 12 capable of receiving signals from a controller 14, that enables the rectification stage. Once the logic circuitry 15 of the rectification stage 12 receives the signal START, the MOSFET R1 (R2) will be "released" (turned off) if and only if the voltage PH1 (PH2) at the secondary side is positive (current entering in the MOSFET) is closed as soon as the voltage PH1 (PH2) attains 0V. From this instant onwards, the MOSFET R1 (R2) will be kept on up to the next pulse START even if the current throughout the MOSFET R1 (R2) is entering in it. In other words, the MOSFET R1 (R2) is "released" (turned off) only once during a period of the signal START. Differently, a common rectification stage in these functioning conditions would release the MOSFET R1 or R2 each time the current flowing therethrough becomes positive.

The signal START may be a dedicated signal, i.e. one respective signal for each MOSFET R1 and R2, or a single signal. In the case of a dedicated signal, each MOSFET R1 or R2 will be turned on (always in accordance to the related voltage PH as described above) at the instant at which the signal START will switch either from the state 0 to the state 1, if the signal is active when high, or from the state 1 to the state 0, if the signal is active when low. In case of a single signal START, common to both MOSFETs R1 and R2, a MOSFET R1 or R2 may be turned on (always in accordance with the related voltage PH as discussed above) by the transition edge 0/1 and the other MOSFET by the transition edge I/O, thus establishing a single-wire communication between controller 14 and rectification stage 12.

More in detail, the current flowing throughout the switches (typically, MOSFETs) is minimized through the functioning phases that are described hereinafter.

In this ensuing description it is presumed that the magnetization inductance of the transformer 16 is much greater than the leakage inductance $L_{LEAK}$.

The resonance time of the circuit is tied to the presence of the leakage inductance $L_{LEAK}$, to the capacitance $C_R$ and to the identical inductances $L_1$ and $L_2$. Supposing that the block capacitance $C_{DC}$ is much greater (at least by an order of magnitude) than the apparent resonance capacitance referred to the primary side $C_R/N^2$, it is possible to estimate a resonance period Tres of the monophase converter as follows:

$$T_{RES} = 2\pi \cdot \sqrt{\frac{L_1 \cdot L_{LEAK} \cdot C_R}{N^2 \cdot L_1 + L_{LEAK}}}$$

thus it is a known design parameter.

The full-bridge stage 18 is driven in a variable frequency phase shift mode by drivers 20, 22, which are controlled through an isolation block 24 by the controller 14. The voltages PHx and PHy at the terminals of the resonance capacitor $C_R$ are outphased between them by a constant time T that is a design parameter of the converter.

Figure 7:
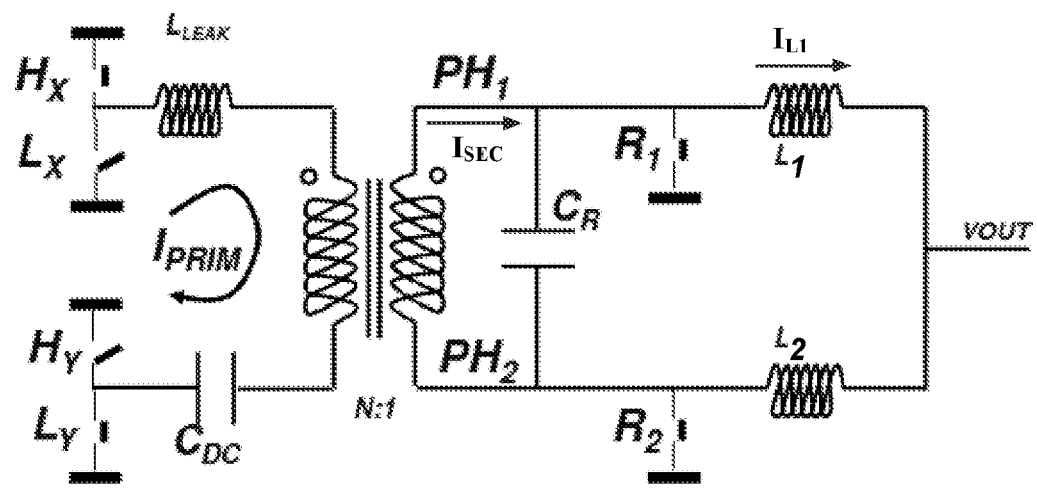
Figure 8:
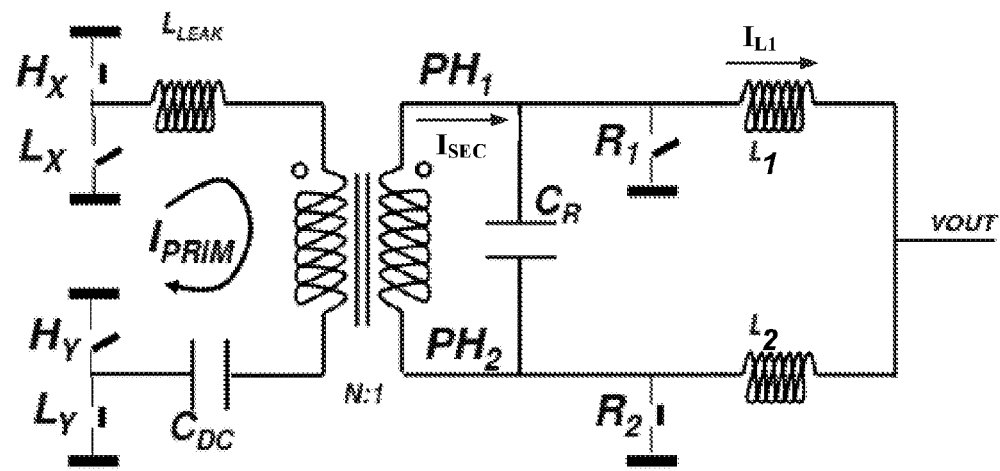
Figure 9:
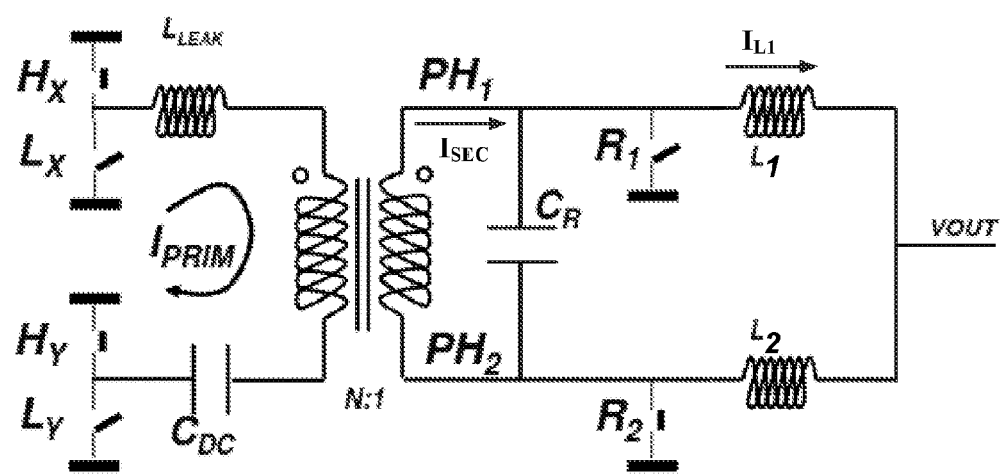
Figure 10:
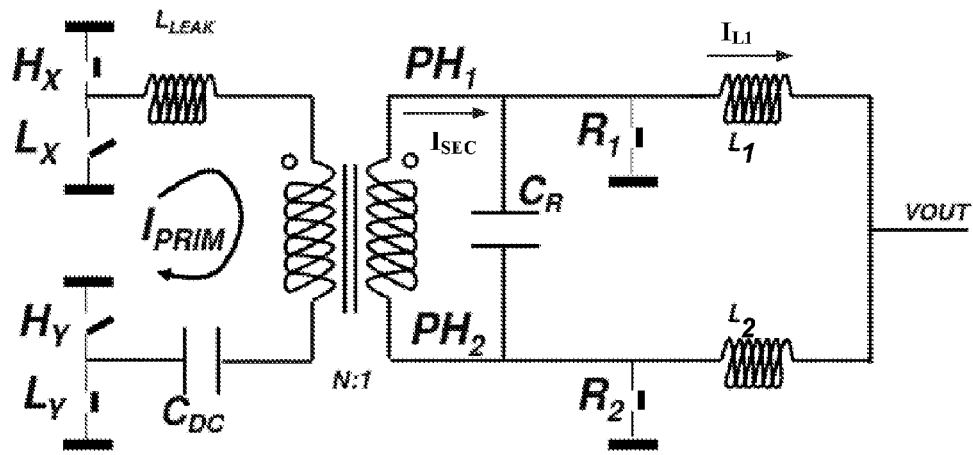
Figure 11:
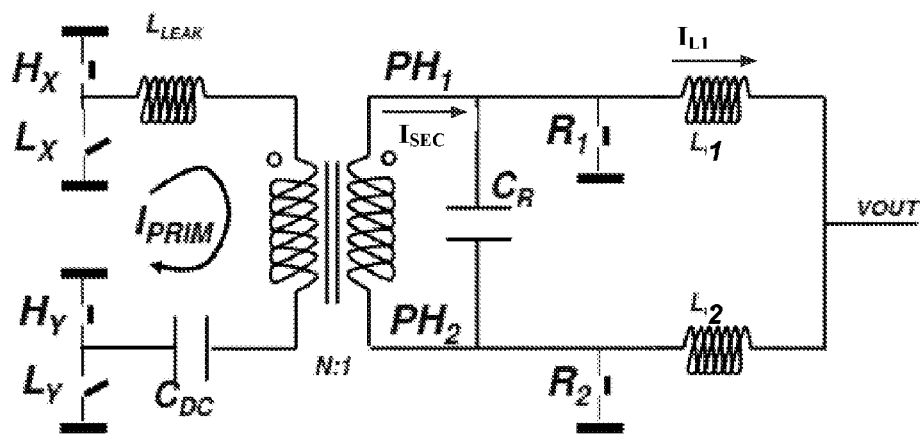

According to the method of this disclosure, the following sequence of operations is carried out cyclically, illustrated in FIGS. 6 to 11 and in the time graph of FIG. 12:

1) STOP1 (FIG. 6):
The low side switches of the primary side (Lx, Ly) and the first and second switches (typically, MOSFETs) R1 and R2 of the rectification stage are on. In this way the current throughout the leakage inductance is constant, the voltages PH1 and PH2 are null and the currents through the MOSFETs R1 and R2 are respectively equal to the currents $I_{L1}$ and $I_{L2}$ flowing throughout the inductances $L_1$ and $L_2$, respectively. The MOSFETs R1 and R2 are not turned off up to the next edge of the signal START1;

2) ENERGY1+START2 (FIG. 7):
The switches of the diagonal xy of the primary side are on (Hx and Ly) and the MOSFETs (R1 and R2) of the rectification stage 12 are on (secondary side short-circuited). In this way the current throughout the leakage inductance $L_{LEAK}$ increases linearly (positive halfwave) in function of the input voltage $V_{IN}$ and so also the current $I_{SEC}$ at the secondary side of the transformer. The voltages PH1 and PH2 are null and the currents through the first and second switches R1 and R2 are respectively equal to the currents $I_{L1}-I_{SEC}$ and $I_{L2}+I_{SEC}$ (FIG. 7). During this operation the signal START1 is switched active and from this instant the rectification stage at the secondary side may "release" (turn off) the first switch R1 (in this case) if the current that flows therethrough becomes greater than zero (circulating towards ground) and thus there is a zero current detection ZCD of the current flowing throughout the MOSFET (that is the voltage PH1 becomes positive);

3) RELEASE1 (FIG. 8):
When the current throughout the MOSFET R1 becomes null this means that $I_{SEC}=I_{L1}$. In this phase the MOSFET R1 is "released" (turned off) and the current throughout the leakage inductance increases according to the resonance law, thus the voltage PH2 is null (R2 on) and the voltage PH1 increases according to the resonance law.

Therefore, there may be two functioning zones depending upon the on duration of the diagonal of switches at the primary side and upon the output load. Indeed, keeping constant the on time TSHIFT of the diagonal (constant on-time) the charge that may be output is limited by the components and by the physical amounts of the system. The sum of the time for energizing the inductance, which depends upon the output current IOUT, upon the current ripple $\Delta I_{RIPPLE}$ through the inductances $L_1$ and $L_2$, upon the leakage inductance $L_{LEAK}$ and upon the input voltage $V_{IN}$, plus half of the resonance period $T_{RES}$ shall not be greater than the on-time duration of the diagonal of switches:

$$T_{ENERGY} = \frac{I_{OUT} - \Delta I_{RIPPLE}}{N \cdot V_{IN}} \cdot L_{LEAK}$$

$$T_{SHIFT} \geq T_{ENERGY} + \frac{T_{RES}}{2}$$

It is clear that the on-time $T_{SHIFT}$ of the diagonal of switches will satisfy certain specifications for ensuring a Zero Voltage Switching (ZVS) at the primary side and for not wasting power because of free-wheeling diodes of power MOSFETs at the primary side during the transition in a ZVS condition.

To ensure the ZVS condition at the primary side in all functioning conditions, the on-time T SHIFT can be made greater than the resonance time.

4a) DISCHARGE1 (FIG. 9):
The diagonal of switches is turned off before the voltage PH1 attains 0V. The primary side is shorted by turning on the two high-side MOSFETs Hx and Hy. The current circulating in the primary side remains constant. The voltage towards ground PH2 is null, the voltage PH1 decreases and a current circulates through the inductor $L_1$.

4b) RECTIFICATION1 (FIGS. 10-11):
The diagonal of switches is turned off after the voltage PH1 has attained 0V. In this functioning condition the voltage PH1 has decreased at 0V. When a null voltage PH1 is detected (ZVD—Zero Voltage Detection), the MOSFET R1 is turned on and will remain on up to the next active edge of the signal START.

The diagonal of switches xy is still on and the leakage inductance is charged linearly with the input voltage.

The steps from 1) to 4a) or 4b) are repeated cyclically exchanging between them the roles of the low-side switch and high-side switch and the roles of the first switch and the second switch and forcing throughout the primary circuit a negative half-wave instead of a positive half-wave, as done by contrast during the above described operation 2).

In order to make even clearer how the method continues, only the following operation is illustrated in detail

5) STOP2:

This operation is the dual operation of the operation STOP1, though the primary circuit is shorted by the high-side MOSFETs Hx and Hy. The MOSFETs at the secondary side are on and will remain on up to the next active edge of the signal START1.

The functioning relating to the turning-on of the second diagonal of switches yx and of the rectifier switch R2 will not be discussed further because it is similar to the previous one having exchanged the diagonals and the currents throughout $L_2$ and $L_1$, and a signal START2 similar to the signal START1.

A characteristic of the control method according to one embodiment of this disclosure is the way in which the switches are driven, in particular the switches of the rectification stage. At the primary side there is a constant on-time ($T_{SHIFT}$) of a diagonal, whilst the on-time of the MOSFETs R1 and R2 of the rectification stage 12 depends upon the voltages referred to ground PH1 and PH2 and upon the signals START1 and START2. Therefore, the rectification stage 12 is not a classic rectification stage that opens a switch R1 or R2 each time the current becomes positive and turns it on each time the respective voltage PH1 or PH2 is becoming negative, but a rectification stage that implements a latched functioning mode. Indeed, the signal START does not correspond to the release (turn-off) or to the immediate turn-on of a MOSFET of the rectification stage, but to enabling the release of the MOSFET when the current becomes positive (though the current does not need be positive/negative when an active edge of the signal START is issued).

Once the MOSFET is released (off), after a time about equal to the resonance period, the voltage referred to ground PH1 (PH2) will attain the ZVS (Zero Voltage Switching) condition of the respective switch of the rectification stage, that will be turned on. This switch of the rectification stage will remain on up to the next active edge of the signal START independently from the fact that the current flowing therethrough is positive/negative.

According to an embodiment, it is possible to use only one signal START and to use its leading edges for turning on R1 and its trailing edges for turning on R2.

The signal START switches high or low (depending on the MOSFET that is to be enabled) with a programmable delay from each turning on of a diagonal at the primary side. If there were no signal START that determines the turning on of a MOSFET R1 or R2 up to the next cycle, functioning conditions could occur, especially at low currents, in which the current at the secondary side becomes greater than the current flowing throughout the respective inductance L1 or L2, turning off R1 or R2. This situation could lead to instability of the converter at low currents because the control law changes radically.

The signal START may be used for turning off the MOSFETs at the secondary side. When this signal is driven at an intermediate voltage (the value of the voltage is not important) between the low and the high logic levels, then the drivers of the rectification stage will connect to ground the gates of the two MOSFETs. This high-impedance functioning condition may be implemented with a single-wire communication (START) as well as with a two-wires communication (START1/START2).

FIGS. 13 and 14 show exemplary embodiments of the driving algorithms of the MOSFETs R1 and R2 using two signals START1/START2 or a single signal START, and an enabling signal ENABLE. Besides the logic levels high 1 and low 0, there is also a level HiZ corresponding to a high impedance state. The signal WATCHDOG indicates that a maximum admissible wait time has elapsed.

The signals ZCD1 and ZCD2 represent the outputs of zero current detection comparators of the current flowing throughout the MOSFETs R1 and R2. For example, the signal ZCD1 is equal to 1 when substantially the current coming from the secondary side of the transformer is greater than the current flowing throughout the inductor $L_1$, that is the current through the MOSFET R1 becomes positive (entering from the drain, thus coming from the node at the voltage PH1).

The signals of ZVD1 and ZVD2 represent the outputs of the zero voltage detection comparators that monitor the voltages PH1 and PH2, respectively, when the relative MOSFET R1 or R2 is off. These comparators may be physically represented by the same zero current detection comparators. Indeed, they sense the voltage PH1 (PH2): when the respective MOSFET is on (a ZCD mode is used), this voltage is given by the product Rdson*I between the on resistance Rdson and the current I flowing throughout the MOSFET; when the respective MOSFET is off (a ZVD mode is used), the signal ZVD is equal to 1 when the voltage PH1 is negative.

The signal ENABLE enables the rectification stage, than may be placed in a high impedance condition HiZ by the signal ENABLE as well as by the signal START. The condition START=HiZ or ENABLE=0 is active in any state and brings the asynchronous state machine back in a reset state.

The signal START, as shown in FIG. 12, is a signal delayed by a time Tstart in respect to the driving signal CMDx of a half-bridge of the primary side. The time Tstart does not necessarily have to be greater than zero but may be also null: in this case, the signal START will coincide with the driving signal CMDx.

The functioning logic of the rectification stage may operate in a dual manner, that is with an inverted signal START, thus the condition START=1 enables the release of the MOSFET R1 and START=0 enables the release of the MOSFET R1.

The MOSFETs R1 and R2 may be directly driven by the command circuit (by means of the driver DRIVER) with an internal signal START. Only the driving signals of the gates of the power MOSFETS R1 and R2 would be available. In this case, the turn on logic of the MOSFETs is the same of that shown above. The ZCD and ZVD information is gathered from the voltages PH1 and PH2 because, when the MOSFET R1 (R2) is on, the relative voltage referred to ground PH1 (PH2) is Rdson*I and thus it is PH1(PH2)=0 when the current through the MOSFET is equal to zero (ZCD condition), whilst when the MOSFET is off the condition PH1(PH2)=0 represents a ZVD condition.

Sometimes it is difficult to implement a precise detection of null current (ZCD) because the voltage PH1 (PH2) is small, because the on resistance Rdson of the respective MOSFET is small, and it is strongly corrupted by noise because of fluctuations due to parasitic inductances of circuits in general and more in particular of the MOSFETs. In this case it is possible to choose to turn off immediately the MOSFET R1 (R2) when the signal START is issued and, after an appropriate delay for masking the output of the respective ZVD comparator, eventually turning on the MOSFET. In these conditions, when the load current increases, the body-drain intrinsic diode of the released MOSFET may turn on while the current is still negative. In this case there is a small loss of efficiency due to the turning on of this intrinsic diode.

As described above, the switching frequency of the system varies in order to optimize the efficiency because the turn on time at the secondary side is directly tied to the resonance of the circuit:

$$T_{RES} = 2\pi \cdot \sqrt{\frac{L_1 \cdot L_{LEAK} \cdot C_R}{N^2 \cdot L_1 + L_{LEAK}}}$$

Being a constant on-time (determined by the resonance) system and in order to not increase losses for Joule effect in the inductors by pre-charging the leakage inductance more than what is strictly necessary, the converter may vary its switching frequency in function of the input voltage $V_{IN}$ and of the output voltage $\backslash T_{OUT}$. Referring to FIG. 15, by approximating the voltage PH1 (PH2) with a rectangular signal of equivalent area, it is possible to write:

$$V_{OUT} = V_{IN\_EQ} \cdot T_{SHIFT} \cdot f_{SW}$$

In this topology, in order to optimize the efficiency, the equivalent voltage $V_{IN\_EQ}$ depends only from the voltage $V_{IN}$ and from the number N (transformation ratio of the transformer), and given that the turn on time $T_{SHIFT}$ is fixed and is determined by the resonant network, the switching frequency should vary when the input voltage $V_{IN}$ or the output voltage $V_{OUT}$ vary.

FIGS. 16, 18 and 19 depict embodiments of control circuits for a converter according to this disclosure. In these control circuits, there is an error generation and compensation block 40 (or an error amplifier (EA) 50 and a compensation block 52 coupled through an analog-to-digital converter (ADC) 54) that generates a regulation error and executes a compensation operation. In an analog embodiment (FIGS. 16 and 19), it may be represented by an error amplifier with a compensation network, whilst in a digital embodiment (FIG. 18) it may be represented by an error amplifier, an analog-to-digital converter ADC and a PID filter.

The time graph of FIG. 17 illustrates how the driving circuit CELL TURN ON MANAGEMENT generates the signals CMDx, CMDy and START.

An adder 42 generates the signal CNT received in input at an analog voltage controlled oscillator (VCO) 44 (or digital VCO 56) as the sum between the signal provided by the error generation and compensation block 40 and a signal proportional to a reference REF/G.

The voltage controlled oscillator, digital 56 or analog 44 depending on the embodiment, has a gain that varies proportionally to the input voltage $V_{IN}$. In particular its gain, that is the frequency of the output signal CKMAIN divided by the value of the input signal CNT, will decrease with an inversely proportionality law when the voltage $V_{IN}$ increases. This feedforward allows to keep constant the gain of the whole system when the input voltage $V_{IN}$ varies and thus to keep stable the loop.

Once the duty-cycle DUTY of the converter has been fixed (thanks to the use of the latched rectification stage illustrated above), it will equal:

$$\text{DUTY} = \frac{V_{OUT}}{V_{IN\_EQ}} = T_{SHIFT} \cdot f_{SW}$$

being $f_{SW}$ the switching frequency of the signal CKMAIN.

With a modulation gain $G_{MOD}$ inversely proportional to the equivalent voltage $V_{IN\_EQ}$ a feedforward control is implemented and the gain G is of the whole system is kept constant. Thus:

$$G_{MOD} = \frac{\text{DUTY}}{\text{COMP}} = \frac{G}{V_{IN\_EQ}}$$

$$\frac{T_{ON} \cdot f_{SW}}{\text{COMP}} = \frac{G}{V_{IN\_EQ}}$$

being COMP a control value in steady-state conditions.

Since the gain $G_{VCO}$ of the VCO is:

$$G_{VCO} = \frac{f_{SW}}{\text{COMP}}$$

then:

$$G_{VCO} = \frac{G}{T_{ON} \cdot V_{IN\_EQ}}$$

The input value of the VCO, in this case represented by COMP in steady-state conditions, will be equal to:

$$\text{COMP} = \frac{V_{OUT}}{G}.$$

Given that very often, for reasons of accuracy of regulation, an integrator is used for carrying out a loop compensation, in order to optimize the response to transients of the reference REF it is possible to keep constant as much as possible the control value COMP when the reference REF varies, so as to not charge or discharge the integral component of the compensation and thus to shorten transients due to a reference variation.

Given that, as previously calculated, the input value of the VCO when the reference varies is Vout/G, this is the offset value to be added. In this way, by adding an amount equal to the signal COMP, this control value COMP will remain constant when the reference varies and its value shall not be modified and thus in this way stresses of the filter PIN are reduced when the reference varies, thus making faster the response.

In order to do this, it is possible to insert an offset OFFSET between the control value COMP and the modulator (the input of which is represented by the VCO). This offset is equal to the ratio between the reference value of the regulator and the gain of the modulator:

$$\text{OFFSET} = \frac{V_{OUT}}{G}$$

Given that in numerous cased the value of Vout coincides with the reference value REF or it is an amplified replica thereof (in case of partition of the feedback from the voltage Vout to the error amplifier), it is possible to write:

$$\text{OFFSET} = \frac{V_{REF}}{G}$$

In this case, at each clock pulse of the VCO (CKMAIN) the diagonal of switches of the primary side represented by the pair Hx-Ly (diagonal X) and Hy-Lx (diagonal Y) is turned on.

For a constant on-time control technique, each diagonal is turned on for a constant time equal to Tshift (settable parameter).

Each time a clock pulse CKMAIN is generated, the signal START changes its state such to be coherent with the turned on diagonal. Indeed, when the diagonal X is on, the enablement to release the MOSFET R1 will be issued as soon as the current through the MOSFET becomes positive; vice versa, when the diagonal Y is on, the enablement to release the MOSFET R2 will be given.

The signal START may be delayed in respect to the driving signals of the diagonals such to compensate the delay between the controller and real driving of the switches at the primary side.

In order to deliver a power that exceeds the power of a monophase resonant converter, it is possible to use a polyphase resonant converter of the type shown in FIGS. 20 and 21 by connecting in parallel a plurality of cells, as done for the common polyphase buck converters. In the example of FIG. 21, cell turn on management blocks $60_1, 60_2, \ldots, 60_N$ are optionally enabled/disabled by means of respective enabling signals EN1, EN2, . . . , ENN. An exemplary time graph of the main signals of the multiphase converter of FIGS. 20 and 21 is shown in FIG. 22.

The clock CKMAIN of the VCO 44 is distributed to the single monophase cells $60_1, 60_2, \ldots, 60_N$ as clock signals CK1, CK2, . . . , CKN by an interleaving management block 62, and the currents of the cells are equalized in order to prevent reliability problems.

Because of eventual mismatches between N cells in parallel, the currents delivered by the cells may be outbalanced. In the constant on-time buck controllers, the current sharing between the phases of the polyphase converter is managed through the variation of the on-time of the single phases according to the current sharing error. FIG. 23a depicts an example of mismatch between two cells connected in parallel of a polyphase converter of this disclosure. For example, if the resonant frequencies of two cells are different, there is a different duration TON of the voltage PH1 (or PH2), but the voltage peak is equal. In this case the mean value of the voltages PH1 and PH2 of the single cells will be different (the various voltages PH1 and PH2 are driven at the same frequency by the main VCO, thus connecting in parallel the cells there are different currents. In the example of FIG. 23a the cell 2 (represented by its voltage PH1) will have a value of regulation equivalent voltage $V_{IN\_EQ2}$ smaller than that of cell 1 and thus it will tend to deliver less current.

In the polyphase converter of this disclosure, preferably the current sharing is not managed by adjusting the on time (TON) of a diagonal of switches at the primary side, but it is managed through the signal START that goes from the controller to the rectification stage. The signal START will be characterized by a programmed minimum delay time Tstart and such to compensate eventual delay between the controller and the driving of the diagonal of the switches at the primary side (carried out by means of opto-isolators, primary drivers, line).

A current sharing management block 64 senses the difference between the current throughout each cell and the average current IAVG of the cells. If the error is positive (cell current smaller than the average current of the cells) the delay time TstartN of the cell N is incremented; if the error of current is negative (cell current greater than the average current of the cells), the delay time TstartN of the cell N will be decreased down to a minimum value set by the system. In the cell that delivers less current, the energization of the leakage inductance at the primary side will be increased and thus will have an increased peak value of the voltage PH1 (or PH2) at the secondary side, whilst the duration TON of the positive (negative) half-wave at the secondary side will be almost constant and determined by the resonance frequency of the cell N.

FIG. 23b shows an example of the result of the correction performed by the current sharing using the signal Tstart. Equalization of currents is done without varying the duration TON of the half-waves PH1 (PH2) at the secondary side (that is fixed and is a function of the resonance period), as it occurs by contrast in a traditional polyphase buck converter, but it is done increasing the peak of half-waves PH1 (PH2) by increasing energization of the leakage inductance (at the expense of the efficiency of the cell).

FIG. 24 depicts a block diagram of a circuit for generating the signal START of a generic cell N. An adder 70 generates a difference signal IERR between the average current IAVG delivered by the cells and the current IOUTN delivered by the cell N. The signal IERR is sent to a generic PI (Proportional-Integral) filter 72 using generic filter coefficients KP and KI (greater than or equal to 0). The output CS DELAY of the PI filter 72 will allow to generate an adjustable delay by means of adjustable delay lines 74, 76. The delay line 74 upstream generates a signal START by default with a minimum delay TSTARTmin, that may be further delayed by the delay line 76 downstream so as the signal STARTN is delayed by a time TstartN in respect to the command CMDXN by the generic cell N, if the average current of the cells is greater than the current of the cell N.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of feedback commanding a resonant converter, comprising:

short-circuiting a primary switching stage and turning off first and second switches of a secondary rectification stage, the resonant converter including:
a primary switching circuit having a primary winding and the primary switching stage which is configured to drive said primary winding, and
a secondary resonant circuit having a secondary winding magnetically coupled to the primary winding, and first and second secondary inductors respectively coupled between an output terminal of the converter and respective terminals of the secondary winding;
energizing the primary switching circuit with a positive half-wave, while keeping on the switches of the secondary rectification stage and monitoring a current flowing through said first switch;
turning off the first switch and monitoring a voltage at the first switch, in response to detecting a zero cross condition of the current flowing through said first switch;
carrying out one of the two following operations:
before the voltage at the first switch nullifies, short-circuiting the primary switching stage, or
after the voltage at the first switch has nullified, energizing the primary switching circuit with a positive half-wave while keeping on the switches of the secondary rectification stage;
turning on the first and second switches;
energizing the primary circuit with a negative half-wave, while keeping on the switches of the secondary rectification stage and monitoring a current flowing through said second switch;
turning off the second switch and monitoring a voltage at the second switch, in response to detecting a zero cross condition of the current flowing through said second switch; and
carrying out one of the two following operations:
before the voltage at the second switch nullifies, short-circuiting the primary switching stage, or
after the voltage at the second switch has nullified, energizing the primary switching circuit with a negative half-wave while keeping on the switches of the secondary rectification stage.

2. The method according to claim 1, wherein a feedback command circuit:
receives feedback signals representing an output voltage available at an output terminal of the resonant converter and an output current delivered throughout said output terminal;
receives voltages available at terminals of said secondary winding; and
commands switches of said primary switching stage and the first and second switches of the secondary rectification stage.

3. The method according to claim 2, comprising:
generating a gain adjustment signal corresponding to said feedback signals;
generating a sum signal as a sum of a gain reference signal and said gain adjustment signal;
outputting a main clock signal at a frequency determined in function of said sum signal, an unregulated supply voltage of the primary switching circuit, and a resonance period value of the converter; and
generating on/off signals, that control the switches of said primary switching stage and of said secondary rectification stage, in function of respective primary and secondary delay times from active edges of the main clock signal.

4. The method according to claim 1, wherein the primary switching stage is a full-bridge primary switching stage and shorting-circuiting the primary switching stage includes turning on low-side switches of the full-bridge primary switching stage and turning off high-side switches of the full-bridge primary switching stage.

5. The method according to claim 1, wherein the resonant converter includes a secondary rectification stage electrically connected in parallel with a resonance capacitor and the first and second switches respectively coupled to form a half-bridge with an intermediate tap coupled to ground.

6. The method according to claim 1, wherein:
the primary switching stage is a full-bridge primary switching stage that includes first and second high-side switches and first and second low-side switches;
energizing the primary switching circuit with the positive half-wave includes turning on the first high-side switch and the second low-side switch; and
energizing the primary switching circuit with the negative half-wave includes turning on the second high-side switch and the first low-side switch.

7. A method of commanding a polyphase resonant converter, comprising:
generating a gain adjustment signal corresponding to feedback signals representing an output voltage available at an output terminal of the polyphase resonant converter and an output current delivered through said output terminal, the polyphase resonant converter including a plurality N of monophase resonant converters each including:
a primary switching circuit having a primary winding and a primary switching stage configured to drive said primary winding,
a secondary winding magnetically coupled to the primary winding,
a secondary rectification stage connected electrically in parallel with the secondary winding and having first and second switches respectively coupled to form a half-bridge,
a feedback command circuit configured to receive the feedback signals, receive voltages available at terminals of the secondary winding, control the primary switching stage and the secondary rectification stage, and receive in input voltages at terminals of the secondary winding;
generating a sum signal as a sum of a gain reference signal and said gain adjustment signal;
outputting a main clock signal at a frequency determined in function of said sum signal and an unregulated supply voltage value of the primary switching circuit;
frequency dividing by N said main clock signal, generating N secondary clock signals outphased among them and each having a frequency N times smaller than the frequency of the main clock signal;
generating a plurality of N primary delay times and N secondary delay times corresponding to a set of output currents delivered by the N monophase resonant converters;
generating on/off signals for each said primary switching stage and the corresponding secondary rectification stage in function of respective primary and secondary delay times from active edges of a respective secondary clock signal.

8. The method according to claim 7, comprising:
generating signals for turning on/off switches of each primary switching stage keeping constant an on-time of each switching stage;
generating signals for turning on/off switches of each secondary rectification stage by adjusting said respective primary and secondary delay times in function of a difference between a delivered current by the respective monophase resonant converter and an average current delivered by a cell of said N monophase resonant converters.

9. A monophase resonant converter, comprising:
a primary switching circuit having a primary winding and a primary switching stage configured to drive said primary winding;
a secondary resonant circuit having a secondary winding magnetically coupled to the primary winding;
a secondary rectification stage electrically connected in parallel with the secondary winding, and having a first switch and a second switch;
a feedback command circuit configured to:
receive feedback signals representing an output voltage at the output terminal of the resonant converter and an output current delivered through said output terminal,
receive voltages at terminals of said secondary winding,
command turning on/off of switches of said primary switching stage and of said secondary rectification stage,
turn on/off, independently with respect to each other, said first and second switches of the secondary rectification stage and the switches of the primary switching stage for implementing a method that includes:
short-circuiting the primary switching stage and turning off the first and second switches of a secondary rectification stage;
energizing the primary switching circuit with a positive half-wave, while keeping on the switches of the secondary rectification stage and monitoring a current flowing through said first switch;
turning off the first switch and monitoring a voltage at the first switch, in response to detecting a zero cross condition of the current flowing through said first switch;
carrying out one of the two following operations:
before the voltage at the first switch nullifies, short-circuiting the primary switching stage, or
after the voltage at the first switch has nullified, energizing the primary switching circuit with a positive half-wave while keeping on the switches of the secondary rectification stage;
turning on the first and second switches;
energizing the primary circuit with a negative half-wave, while keeping on the switches of the secondary rectification stage and monitoring a current flowing through said second switch;
turning off the second switch and monitoring a voltage at the second switch, in response to detecting a zero cross condition of the current flowing through said second switch; and
carrying out one of the two following operations:
before the voltage at the second switch nullifies, short-circuiting the primary switching stage, or
after the voltage at the second switch has nullified, energizing the primary switching circuit with a negative half-wave while keeping on the switches of the secondary rectification stage.

10. The resonant converter according to claim 9, wherein said feedback command circuit comprises:
a control circuit configured to receive said feedback signal and the voltages available at the terminals of said secondary winding, to command the turning on/off of the switches of said primary switching stage and to generate on/off signals for the switches of the secondary rectification stage; and
driving stages configured to drive the switches of the secondary rectification stage, each enabled by a respective one of said on/off signals.

11. The resonant converter according to claim 9, wherein said feedback command circuit comprises:
a control circuit configured to receive in input said feedback signals, to command the turning on/off of the switches of said primary switching stage and to generate at least an on/off signal;
a state machine with enabling input, configured to receive said at least an on/off signal and the voltages at the terminals of said secondary winding, and to switch the switches of said secondary rectification stage in function of said at least an on/off signal and of the voltages at the terminals of the secondary winding.

12. The resonant converter according to claim 11, wherein said at least an on/off signal includes first and second on/off signals and said state machine is configured to switch the first and second switches of the secondary rectification stage using the first and second on/off signals, respectively.

13. The resonant converter according to claim 9, wherein said control circuit comprises:
an error circuit configured to receive in input said feedback signals and to output a corresponding gain adjustment signal;
a voltage controlled oscillator configured to receive a sum signal generated as a sum of a gain reference signal and said gain adjustment signal, and to output a main clock signal at a frequency determined in function of said sum signal, unregulated supply voltage value of the primary switching circuit, and a value of a resonance period of the converter;
a driving circuit configured to receive said main clock signal and to generate on/off signals of the switches of said primary switching stage and of said secondary rectification stage in function of respective primary and secondary delay times from active edges of the main clock signal.

14. A polyphase resonant converter, comprising:
a plurality N of monophase cells each including:
a primary switching circuit having a primary winding and a primary switching stage configured to drive said primary winding;
a secondary resonant circuit having a secondary winding magnetically coupled to the primary winding;
a secondary rectification stage electrically connected in parallel with the secondary winding, and having a first switch and a second switch;
a feedback command circuit configured to:
receive feedback signals representing an output voltage at the output terminal of the resonant converter and an output current delivered through said output terminal,
receive voltages at terminals of said secondary winding,
command turning on/off of switches of said primary switching stage and of said secondary rectification stage, turn on/off, independently with respect to each other, said first and second switches of the secondary rectification stage and the switches of the primary switching stage for implementing a method that includes:

short-circuiting the primary switching stage and turning off the first and second switches of a secondary rectification stage;

energizing the primary switching circuit with a positive half-wave, while keeping on the switches of the secondary rectification stage and monitoring a current flowing through said first switch;

turning off the first switch and monitoring a voltage at the first switch, in response to detecting a zero cross condition of the current flowing through said first switch;

carrying out one of the two following operations:
before the voltage at the first switch nullifies, short-circuiting the primary switching stage, or
after the voltage at the first switch has nullified, energizing the primary switching circuit with a positive half-wave while keeping on the switches of the secondary rectification stage;

turning on the first and second switches;

energizing the primary circuit with a negative half-wave, while keeping on the switches of the secondary rectification stage and monitoring a current flowing through said second switch;

turning off the second switch and monitoring a voltage at the second switch, in response to detecting a zero cross condition of the current flowing through said second switch; and carrying out one of the two following operations:
before the voltage at the second switch nullifies, short-circuiting the primary switching stage, or
after the voltage at the second switch has nullified, energizing the primary switching circuit with a negative half-wave while keeping on the switches of the secondary rectification stage.

15. The polyphase resonant converter according to claim 14, further comprising:

an error circuit configured to receive said feedback signals and to output a corresponding gain adjustment signal;

a voltage controlled oscillator configured to receive a sum signal corresponding to a sum of a gain reference signal and said gain adjustment signal, and to output a main clock signal at a frequency determined in function of said sum signal in correspondence of an unregulated supply voltage value of the primary switching circuit;

a frequency divider configured to divide by N said main clock signal, and generate N secondary clock signal outphased among them and each having a frequency N times smaller than the frequency of the main clock signal;

a delay circuit configured to receive output currents of the N monophase resonant converters and to generate a corresponding plurality N of primary and secondary delay times;

a plurality N of driving circuits each configured to receive in input a respective secondary clock signal and to generate on/off signals of the switches of the respective primary switching stage and of the respective secondary switching stage in function of respective first and second delay times from active edges of the secondary clock signal.

16. The polyphase resonant converter according to claim 14, wherein each command circuit comprises:

a control circuit configured to receive said feedback signal and the voltages available at terminals of a resonance capacitor of the secondary resonant circuit, to command the turning on/off of the switches of said primary switching stage and to generate on/off signals for the switches of the secondary rectification stage; and driving stages configured to drive the switches of the secondary rectification stage, each enabled by a respective one of said on/off signals.

17. The polyphase resonant converter according to claim 16, wherein said control circuit comprises:

an error circuit configured to receive in input said feedback signals and to output a corresponding gain adjustment signal;

a voltage controlled oscillator configured to receive a sum signal generated as a sum of a gain reference signal and said gain adjustment signal, and to output a main clock signal at a frequency determined in function of said sum signal, unregulated supply voltage value of the primary switching circuit, and a value of a resonance period of the converter; and a driving circuit configured to receive said main clock signal and to generate on/off signals of the switches of said primary switching stage and of said secondary rectification stage in function of respective primary and secondary delay times from active edges of the main clock signal.

18. The polyphase resonant converter according to claim 14, wherein each command circuit comprises:

a control circuit configured to receive in input said feedback signals, to command the turning on/off of the switches of said primary switching stage and to generate at least an on/off signal;

a state machine with enabling input, configured to receive said at least an on/off signal and the voltages at terminals of a resonance capacitor of the secondary resonant circuit, and to switch the switches of said secondary rectification stage in function of said at least an on/off signal and of the voltages at the terminals of the resonance capacitor.

19. The polyphase resonant converter according to claim 18, wherein said at least an on/off signal includes first and second on/off signals and said state machine is configured to switch the first and second switches of the secondary rectification stage in function of said first and second on/off signals, respectively.

* * * * *